(12) United States Patent
Soon et al.

(10) Patent No.: US 9,864,118 B2
(45) Date of Patent: Jan. 9, 2018

(54) PHOTOCHROMIC SOLAR CONTROL FILMS

(71) Applicant: SAINT-GOBAIN PERFORMANCE PLASTICS CORPORATION, Solon, OH (US)

(72) Inventors: Jia-Mei Soon, L'hay les Roses (FR); Charles Leyder, Cambridge, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 14/984,181

(22) Filed: Dec. 30, 2015

(65) Prior Publication Data

US 2016/0202402 A1    Jul. 14, 2016

(30) Foreign Application Priority Data

Dec. 31, 2014 (FR) .................................... 14 03053

(51) Int. Cl.
*G02F 1/03* (2006.01)
*G02B 5/23* (2006.01)
*G02B 5/20* (2006.01)

(52) U.S. Cl.
CPC ............... *G02B 5/23* (2013.01); *G02B 5/208* (2013.01)

(58) Field of Classification Search
CPC .................................. G02B 5/23; G02B 5/208
USPC ................ 359/241, 244, 240, 238, 237, 503
See application file for complete search history.

(56) References Cited

U.S. PATENT DOCUMENTS

| | | | |
|---|---|---|---|
| 4,686,196 A | 8/1987 | Gliemeroth et al. | |
| 5,843,548 A | 12/1998 | Sanders | |
| 7,036,932 B2 * | 5/2006 | Boulineau | B29C 45/14811 351/159.62 |
| 7,259,902 B2 * | 8/2007 | Yoshimura | C03C 17/36 359/241 |
| 7,273,659 B2 | 9/2007 | Garcia | |
| 7,441,893 B2 * | 10/2008 | Momoda | B32B 27/08 351/159.61 |
| 2005/0136260 A1 | 6/2005 | Garcia | |
| 2010/0055448 A1 * | 3/2010 | Tomura | B82Y 10/00 428/328 |
| 2010/0062242 A1 | 3/2010 | De Meyer et al. | |
| 2013/0164511 A1 | 6/2013 | Bae et al. | |
| 2013/0330570 A1 | 12/2013 | Michiels et al. | |
| 2014/0326932 A1 | 11/2014 | Akiyama | |
| 2014/0334026 A1 | 11/2014 | Gross et al. | |
| 2016/0109628 A1 * | 4/2016 | Weber | G02B 1/14 359/352 |

FOREIGN PATENT DOCUMENTS

| | | | |
|---|---|---|---|
| CN | 101024742 B | 5/2010 | |
| CN | 103402758 A | 11/2013 | |

(Continued)

OTHER PUBLICATIONS

International Search Report and Written Opinion for PCT Application No. PCT/US2015/068037, dated Apr. 28, 2016, 14 pages.

(Continued)

*Primary Examiner* — Tuyen Tra

(74) *Attorney, Agent, or Firm* — Abel Law Group, LLP; Thomas Osborn

(57) ABSTRACT

The present disclosure is directed to solar control films containing a photochromic layer. For example, in certain embodiments, a solar control film includes a photochromic layer comprising an inorganic photochromic material and an infrared control layer.

18 Claims, 4 Drawing Sheets

(56) References Cited

FOREIGN PATENT DOCUMENTS

| CN | 103998568 A | 8/2014 |
|---|---|---|
| DE | 102004103086 A1 | 1/2006 |
| JP | 2005325087 A | 11/2005 |
| WO | 2004011506 A1 | 2/2004 |
| WO | 2005095540 A1 | 10/2005 |
| WO | 2012165579 A1 | 12/2012 |
| WO | 2013132123 A1 | 9/2013 |

OTHER PUBLICATIONS

Kanu, Sapna Shrestha et al., "Thin Films for Solar Control Applications," Proceedings of the Royal Society A, vol. 466, Issue 2113, Epub. Oct. 9, 2009, pp. 19-44.

Mongstad, Trygve, et al., "A New Thin Film Photochrmoic Material: Oxygen-Containing Yttrium Hydrid." Solar Energy Materials & Solar Cells, pp. 3596-3599, Sep. 16, 2011.

Mongstad, T., et al, "Surface Oxide on Thin Films of Yttrium Hydride Studied by Neutron." American Institute of Physics, Applied Physics Letters, pp. May 10, 2012.

Maehlen, Jan Petter, et al., "Lattice Contraction in Photochromic Yttrium Hydride" Journal of Alloys and Compounds, pp. 1-3 (2013).

Pishtshev, Aleksandr, et al., "Role of Oxygen in Materials Properties of Yttrium Trihydride." Journal of Alloys and Compounds, May 22, 2014.

* cited by examiner

PHOTOCHROMIC SOLAR CONTROL FILMS

CROSS-REFERENCE TO RELATED APPLICATION(S)

This application claims priority under 35 U.S.C. §119(a)-(d) to French Patent Application No. 14 03053 entitled "PHOTOCHROMIC SOLAR CONTROL FILMS," by Jia-Mei Soon et al., filed Dec. 31, 2014, which is assigned to the current assignee hereof and incorporated herein by reference in its entirety.

FIELD OF THE DISCLOSURE

The present disclosure relates to solar control films, and more particularly to, solar control films which have a variable performance in response to ultraviolet light.

RELATED ART

State of the art solar control films, such as Solmox LX70 available from Saint-Gobain Corporation utilizes a pair of substrates sandwiching a solar control stack and adhesive layers as illustrated in FIG. 1. To meet industry demands for weatherability of the film, the stack requires a UV protection PET substrate to protect the solar control stack from deterioration from UV light. Such UV protection substrates limit the ability to create very thin solar control films, and do not improve and can in fact deteriorate the optical performance of the solar control films.

Accordingly, a need exists to develop new solar control film constructions which overcome these and other drawbacks.

The current inventors have surprisingly discovered that the addition of an inorganic photochromic layer can replace typical UV protection substrates in such solar control films and provide the necessary UV protection to the solar control stack without deteriorating and even improving the optical and solar performance of the solar control film as a whole.

BRIEF DESCRIPTION OF THE DRAWINGS

Embodiments are illustrated by way of example and are not limited in the accompanying figures.

Figure 1:
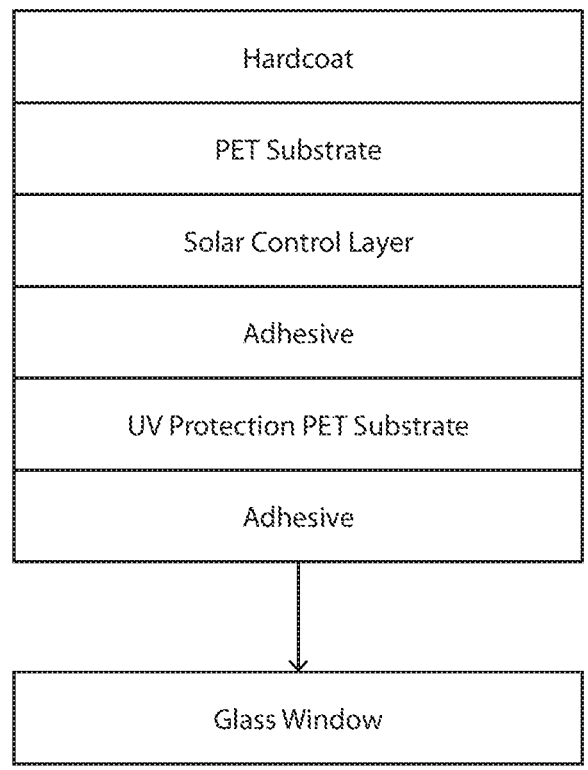
FIG. 1 includes an illustration of a comparative solar control film.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

As used herein, the visible light transmittance (VLT) in intended to mean the ratio of total visible light that is transmitted through a window film/glass system.

The visible light reflectance (VLR) is intended to mean the total visible light that is reflected by a window film/glass system.

The total solar energy rejected (TSER) is intended to mean the total solar energy (heat) rejected by a window film/glass system.

The VLT, VLR, TSER, SHGC and LTSHGC are calculated according to the ASTM standard (see e.g., NFRC-100, NFRC-200 and NFRC-300) or ISO standard (see e.g. ISO 9050).

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control film arts.

The present disclosure is directed to solar control films incorporating an inorganic photochromic layer. For example, the present inventors surprisingly discovered that by incorporating an inorganic photochromic layer, the film composite surprisingly exhibited a synergistic improvement in the weatherability of the film while decreasing the film's thickness and even improving the optical properties of the film. The concepts are better understood in view of the embodiments described below that illustrate and do not limit the scope of the present invention.

Figure 2:
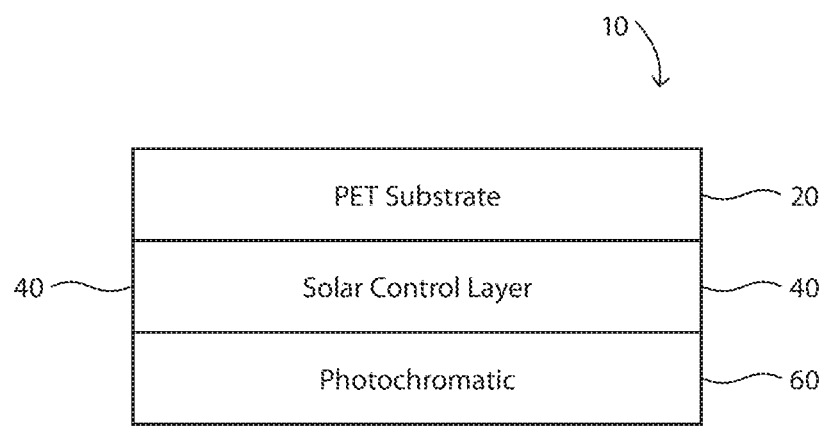
FIG. 2 includes an illustration of a solar control film containing a photochromic layer according to one embodiment.

Referring to FIG. 2, a solar control film can generally include a substrate 20, a solar control layer 40, and a photochromic layer 60.

The substrate 20 can include an organic or inorganic material. In an embodiment, the substrate 20 can include a transparent polymer. The transparent polymer can include a polyacrylate, a polyester, a polycarbonate, a polysiloxane, a polyether, a polyvinyl compound, another suitable class of transparent polymer, or a mixture thereof.

In a particular embodiment, the transparent polymer includes a polyacrylate. The polyacrylate can be a poly(methylacrylate), a poly(ethylacrylate), a poly(propylacrylate), a poly(vinylacrylate), a poly(methyl methacrylate), a poly(ethyl methacrylate), a poly(propyl methacrylate), a poly(vinyl methacrylate), or a mixture thereof. In another embodiment, the polyacrylate can be a copolymer of two, three, or more acrylic precursors. The acrylic precursors can include methyl acrylate, ethyl acrylate, propyl acrylate, vinyl acrylate, methyl methacrylate, ethyl methacrylate, propyl methacrylate, vinyl methacrylate. For example a copolymeric polyacrylate can include poly(methyl methacrylate vinyl methacrylate). In one particular embodiment, the transparent polymer comprises poly(methyl methacrylate). In one other particular embodiment, the transparent polymer consists essentially of poly(methyl methacrylate). In one further embodiment, the transparent polymer comprises poly(vinyl methacrylate). In one other particular embodiment, the transparent polymer consists essentially of poly(vinyl methacrylate).

In one embodiment, the transparent polymer includes a polyester. The polyester can include a polyethylene terephthalate (PET), a polyethylene napthalate, a polybutylene terephthalate, a polyethylene isonaphthalate, or any combination thereof. In one particular embodiment, the transparent polymer comprises PET. In another particular embodiment, the transparent polymer consists essentially of PET.

In one embodiment, the transparent polymer includes a polyether. The polyether can be polyethylene ether, polypropylene ether, polybutylene ether, or any combination thereof. In another embodiment, the polyether can be a copolymer of two, three, or more polyols. For example, the polyether can be a copolymer of 1,2-ethanediol, 1,2-propanediol, 1,3-propanediol, 1,2-butanediol, 1,3-butanediol, 1,4-butanediol.

In one embodiment, the transparent polymer can be a polyvinyl compound. The polyvinyl compound can be a polyvinyl alcohol, a polyvinyl ester, a polyvinyl acetal, or any combination thereof. In one embodiment, the polyvinyl acetal can include polyvinyl butyral. In one particular embodiment, the transparent polymer consists essentially of polyvinyl butyral. In another embodiment, the polyvinyl compound can be a copolymer of a vinyl alcohol derivative and a olefin. The vinyl alcohol derivative can be vinyl acetate. In one embodiment, the polyvinyl compound can be poly(ethylene vinyl acetate).

In yet one further embodiment, the transparent polymer can have a refractive index that is equal or within 0.03 units from an adjacent layer. For example, if an adjacent layer is glass having a refractive index between 1.47 and 1.55, the transparent polymer can be made of a material that is within 0.03 units of the refractive index of the glass. In one embodiment, an adjacent layer can have a refractive index of 1.49 and the transparent polymer can be of a material having a refractive index of about 1.49. For example, the transparent polymer can be poly(methyl methacrylate) with a refractive index of 1.49. In another embodiment, an adjacent layer can have a refractive index of 1.55 and the transparent polymer can be of a material having a refractive index of about 1.57. For example, the transparent polymer can be poly(ethylene terephthalate) with a refractive index of 1.57. In a more particular embodiment, the substrate 20 includes a polyalkylmethacrylate, wherein the alkyl group has 1 to 3 carbon atoms.

In a particular embodiment in which haze is a concern, the substrate 20 can be essentially free of a polyolefin, such as polyethylene, due at least in part to the crystalline and amorphous phases having significantly different refractive indices causing a high level of haze. In an embodiment, the substrate 20 can include nanoparticles such as silica, $TiO_2$, ITO, $SnO_2$ doped with Sb. The nanoparticles are aimed at increasing (in the case of ITO, $SnO_2$ doped with Sb), $TiO_2$) or decreasing (in the case of silica) the refractive index of the substrate 20. In another embodiment, the substrate 20 can include a glass, a sapphire, a spinel, or an aluminum oxynitride ("AlON").

Referring again to FIG. 2, the solar control film 10 can include a solar control layer 40 disposed between the substrate 20 and the photochromic layer 60.

The number of layer, compositions, and thicknesses of the layers within the solar control layer 40 are selected to allow substantial transmission of visible light while attenuating a significant amount of near IR radiation. There are many materials, constructions, and methods to make different solar control layers for a particular application. For example, broadly speaking, solar control layers can be a plurality of alternating micro layers of differing refractive index, a transparent metal based multilayer construct, a solar control particle dispersed within a polymeric binder, or others.

In particular embodiments of the present disclosure, the layers within the solar control layer can include silver-based layers, metal-based layers (other than silver-based layers), metal oxide layers, metal nitride layers and combinations thereof.

Figure 3:
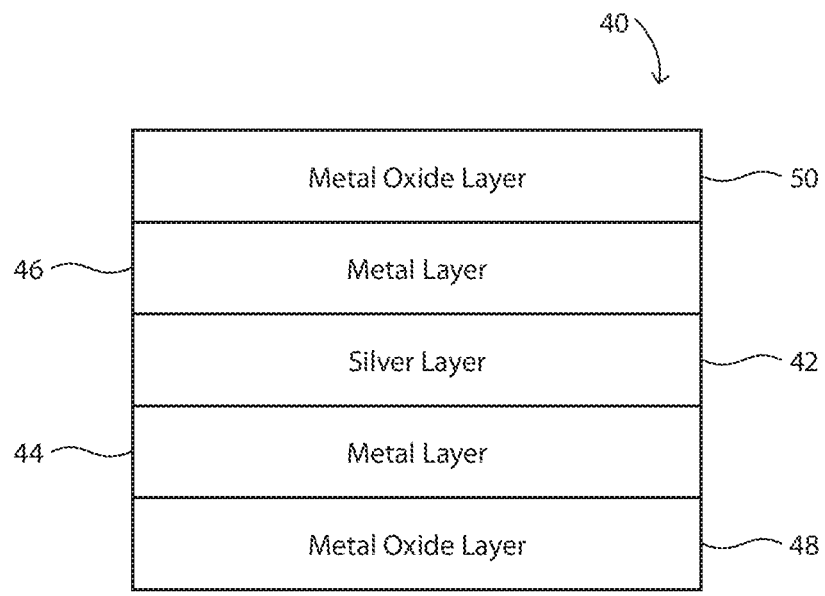
FIG. 3 includes an illustration of a solar control layer according to one embodiment.

Referring to FIG. 3, there is illustrated a specific example of one preferred embodiment of a solar control layer according to the present disclosure. It is to be understood that there many different configurations within the scope of this disclosure, and the solar control layer illustrated in FIG. 3 is just one example.

As illustrated in FIG. 3, the solar control layer can include one or more silver-based layers 42. Any of the one or more silver-based layers described above can contain silver, and in particular embodiments can consist essentially of silver. As used herein, the phrase "consist essentially of silver" refers to a silver based layer containing at least 95 atomic % silver. In other embodiments, the one or more silver-based layer can have no greater than 30 atomic %, no greater than 20 atomic %, or even no greater than 10 atomic % of another metal, such as, gold, platinum, palladium, copper, aluminum, indium, zinc, or any combination thereof.

Any of the one or more silver-based layers 42 can have a thickness of at least 0.1 nm, at least 0.5 nm, or even at least 1 nm. Furthermore, any of the one or more silver-based layers may have a thickness of no greater than about 100 nm, no greater than 50 nm, no greater than 25 nm, or even no greater than 20 nm. Moreover, any of the one or more silver-based layers can have a thickness in a range of any of the maximum and minimum values described above, such as from 0.5 nm to about 25 nm, or even from 1 nm to 20 nm.

In fact, a particular advantage of certain embodiments of the present disclosure is the ability to create solar control films that have a reduced amount of precious metal such as silver and gold, while maintaining equivalent performance. Inclusion of a photochromic layer as discussed below can allow for use of fewer and/or thinner precious metal layers yet achieve equivalent performance in solar control characteristics such as TSER while sill further maintaining desired optical properties. Thus, in particular embodiments, the solar control layer can have a lower total thickness of precious metal, such as at least about 90% lower, at least about 80% lower, at least about 70% lower, at least about 60% lower, or even at least about 50% lower than an equivalent amount of precious metal material required to achieve a TSER of at least about 55% and a VLT of at least about 65% without the photochromic layer present. It is to be understood that the precise amount of precious metal material that can be removed depends on the specific type of precious metal and the specific type and thickness of the photochromic layer. Further it is to be understood that the TSER and VLT measurements used to determine a thickness difference between a reference sample without the photochromic layer and the sample of interest with a photochromic layer are performed in the bleached state.

In particular embodiments, the solar control layer can include one or more metal-based layers 44,46. For example, the solar control layer can include a multi-layer stack with a silver layer 42 sandwiched by metal layers 44,46. Any of the one or more metal-based layers described herein can consist essentially of a metal. As used herein, the phrase "consisting essentially of a metal" refers to at least 95 atomic % of a metal.

In an embodiment, any of the one or more metal based layers described herein can contain an essentially pure metal or in other embodiments, a metal alloy. In other embodiments, any of the one or more metal based layers can contain a metal alloy, such as for example containing a predominant metal in a concentration of at least 70 atomic %, and a minor metal in a concentration of less than 30 atomic % based on the total weight of the metal based layer. Any of the one more metal based layers described herein can contain a metal including gold, titanium, aluminum, platinum, palladium, copper, indium, zinc or combinations thereof. In a particular embodiment, any one of the one more metal based layers described herein can contain gold. In other particular embodiments, the metal based layer(s) can be essentially free of gold. As used herein, the phrase "essentially free of gold" refers to a metal based layer containing less than 5 atomic % gold.

Any of the one or more metal-based layers 44,46 can have a thickness that allows the metal-based layers 44,46 to be substantially transparent and provide sufficient protection to the silver-based layer. In a particular embodiment, any of the one or more metal-based layers described above can have a thickness of at least 0.1 nm, at least 0.5 nm, or even at least 1 nm. Further, any of the one or more metal-based layers described above may have a thickness of no greater than 100 nm, no greater than 55 nm, no greater than 5 nm, or even no greater than about 2 nm.

Any of the one or more metal-based layers described above can have the same thicknesses or can have a different thickness. In a particular embodiment, each of the one or more metal-based layers have the substantially the same thickness. As used herein, "substantially the same thickness" refers to a thicknesses that are within 10% of each other. The metal oxide based layer can be disposed adjacent to, or even, directly contacting a major surface of a metal based layer opposite the silver based layer.

In further particular embodiments, the solar control layer 40 can include one more metal oxide layer(s) 48,50, particularly in addition to silver layers, and in certain embodiments, in addition to silver layers and metal layers discussed above. For example, a solar control layer can include a multi-layer stack including a silver layer sandwiched by metal layers, which are sandwiched by metal oxide layers. In particular embodiments, a solar control layer can include two of such stacks, i.e. the above stack configuration repeated with a shared metal-oxide layer.

Any of the one or more metal oxide layer(s) 48,50 can contain a metal oxide such as a titanium oxide, an aluminum oxide, $BiO_2$, PbO, NbO, SnZnO, $SnO_2$, $SiO_2$, ZnO, or any combination thereof. In a particular embodiment, a metal oxide layer can contain and even be substantially composed of a titanium oxide or an aluminum oxide. The metal oxide layer(s) 48,50 can have a thickness of at least about 0.5 nm, at least 1 nm, or at least 2 nm, and in another embodiment, may have a thickness of no greater than 100 nm, no greater than 50 nm, no greater than 20 nm, or even no greater than 10 nm. Moreover, any of the one or more metal oxide layer(s) discussed above can have a thickness in a range of any of the maximum and minimum values described above, such as, from 0.5 nm to 100 nm, or even from 2 nm to 50 nm.

Referring again to FIG. 2, the solar control film includes a photochromic layer 60. As used herein, the phrase "photochromic layer" refers to a single or multiple layers which can react to the exposure of UV light to darken or shade the entire film thereby decreasing, at least, the amount of visible light that can be transmitted through the photochromic layer and thus the solar control film as a whole. Further, in addition to affecting the visible light transmittance in response to UV light, the photochromic layer can further provide additional dynamic capability to other properties, such as the total solar energy rejection (TSER).

A particular advantage of certain embodiments of the present disclosure is the ability for the photochromic layer 60 to provide a UV filtering function in addition to dynamic visible light transmittance capability. When combined with a solar control layer as discussed above, which are susceptible to degradation by long term exposure to UV light, the photochromic layer can provide UV protection to the underlying solar control layer thereby enabling removing the so called "counter substrate" which has traditionally been needed to adequately protect the solar control layer.

The photochromic layer can include or even consist essentially of a photochromic material.

In particular embodiments, the photochromic material can be an inorganic photochromic material.

In certain embodiments, the inorganic photochromic material can be an inorganic oxide. In very particular embodiments, the inorganic oxide photochromic material can be an inorganic metal oxide photochromic material. For example, suitable inorganic metal oxide photochromic materials can include an oxide of molybdenum, tungsten, vanadium, titanium, zirconium, tantalum, niobium, yttrium, zinc, or combinations of the preceding metal oxides. In very particular embodiments, the inorganic oxide photochromic material can include yttrium hydride lightly doped with oxygen.

In certain embodiments, the photochromic layer can include the combination of an inorganic metal oxide photochromic material and a metal. In very particular embodiments, the metal can include silver.

In certain embodiments, the photochromic layer can have a desirable thickness. For example, in particular embodiments, the photochromic layer can have a thickness of at least 30 nanometers, at least 50 nanometers, or even at least 80 nanometers. In further embodiments, the photochromic layer can have a thickness of no greater than 2000 nanometers, no greater than 1000 nanometers, no greater than 500 nanometers, no greater than 400 nanometers, no greater than 300 nanometers, or even no greater than 200 nanometers. Moreover, the photochromic layer can have a thickness in a range of any of the minimums and maximums provided above, such as in a range of from 50 to 2000 nanometers.

In fact, a particular advantage of certain embodiments of the present disclosure is the ability to form very thin photochromic layers with an inorganic photochromic material. Wet coats employing organic photochromic materials are limited in their ability to meet the demanding thickness limitations within a solar control film.

As illustrated in FIG. 2, the photochromic layer can be disposed adjacent to the solar control layer such that, when installed, light, such as sunlight, is filtered through the photochromic layer before reaching the solar control layer to thereby provide, at least, UV protection to the solar control layer.

In particular embodiments, the photochromic layer can be disposed directly adjacent the solar control layer. In other embodiments, as will be discussed in more detail below, there can be one or more intervening layers, such as an adhesive layer, disposed between the solar control layer and the photochromic layer.

In certain embodiments, the solar control film can include more than one photochromic layer. For example, a second photochromic layer can be disposed such that the two photochromic layers sandwich the solar control layer.

Figure 4:
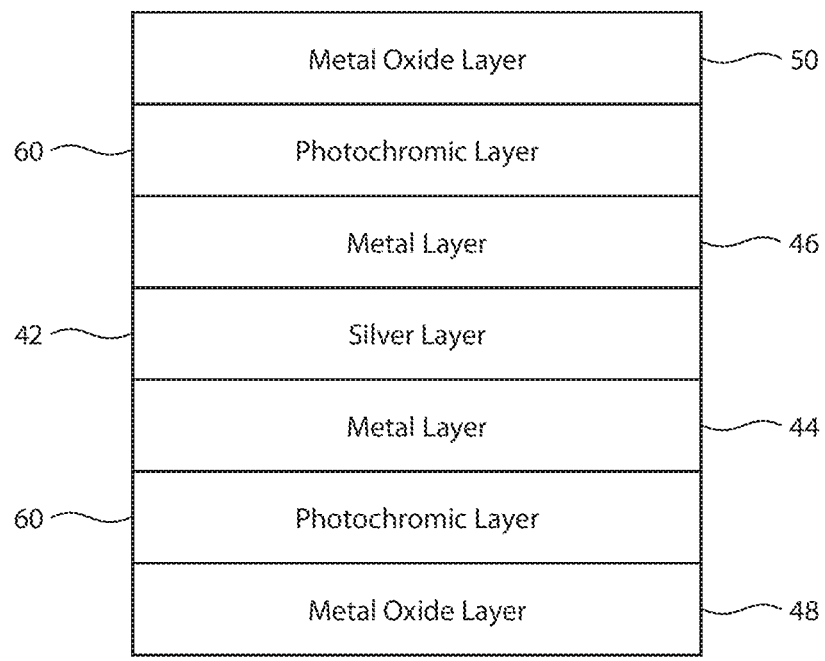
FIG. 4 includes an illustration of a solar control layer having an integrated photochromic layer according to one embodiment.

In certain embodiments, the photochromic layer can be integrated within the solar control layer. For example, as illustrated in FIG. 3, the solar control layer can include a multi-layer construct including silver layers, metal layers, and metal oxide layers. The photochromic layer can be disposed within any of these layers and thereby be integrated within the solar control layer. For example, FIG. 4 illustrates one such embodiment, where the photochromic layer is disposed within a solar control multilayer construct. As illustrated in FIG. 4, the photochromic layer can be disposed between the metal layer and metal oxide layer. In other embodiments, as illustrated in FIG. 5, the photochromic layer can be disposed between the silver layer and the metal oxide layer.

Figure 5:
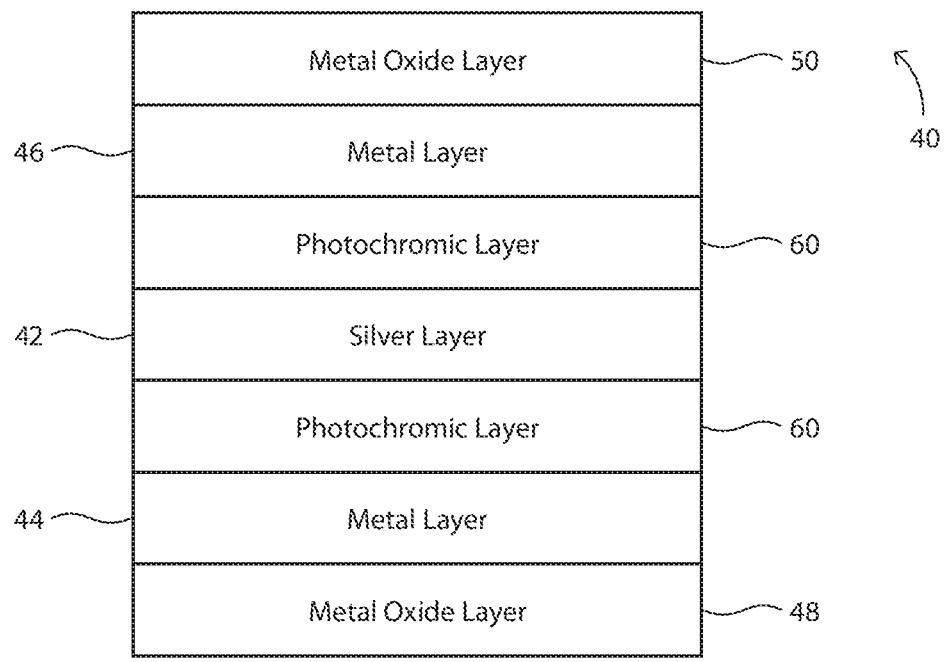
FIG. 5 includes an illustration of a solar control layer having an integrated photochromic layer according to another embodiment.

In certain embodiments, as particularly illustrated in FIGS. 4 and 5, the solar control layer 40 can include more than one photochromic layer 60.

In particular embodiments, the photochromic layer can be disposed within a solar control film, and even a solar control layer containing a silver layer such that light to be filtered reaches at least one photochromic layer before reaching the silver layer, such as illustrated in FIGS. 4 and 5.

In fact, a particular advantage of certain embodiments of the present disclosure is the adaptability of the placement of an inorganic photochromic layer within the solar control film. For example, certain inorganic photochromic layers can be deposited by a sputtering process, as will be discussed in more detail below. Similarly, the solar control layers can be formed by sputtering, allowing for the in-line integration into the sputtering process to produce the solar control film.

Figure 6:
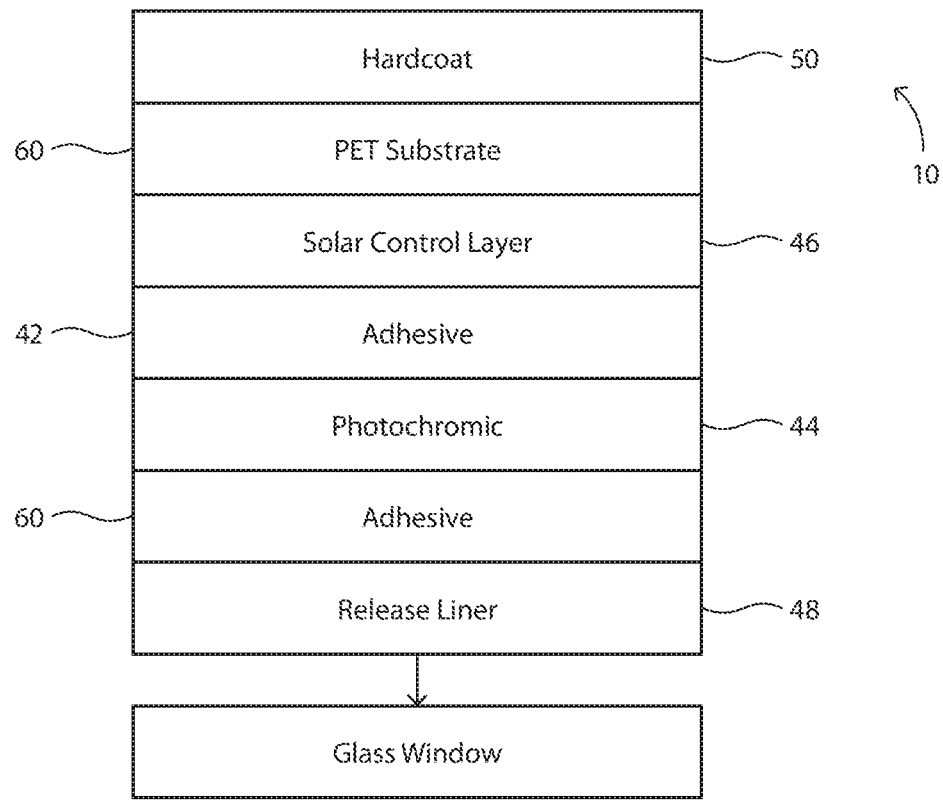
FIG. 6 includes an illustration of a solar control film according to one embodiment.

Referring now to FIG. 6, an adhesive layer 80 can be disposed adjacent the photochromic layer. The adhesive layer 80 can be adapted to adhere the solar control film 10 to a glass window, or other transparent substrate. The photochromic layer and the adhesive layer 80 can be positioned such that that the photochromic layer provide a physical barrier between the adhesive layer 80 and the solar control layer.

The adhesive layer 80 can include any adhesive that is clear and has at least 85% transparency to visible light for the particular thickness of the adhesive layer 80. In one embodiment, the adhesive layer is a pressure sensitive adhesive. In some cases, once installed on a window, the adhesive layer 80 is the first layer within the transparent composite to be crossed by the sunlight. In such case, a UV resistant layer can be used as the adhesive layer 80 such as an acrylate. An additive, such as a UV absorber, can be added in order to increase durability of the solar control film in addition to the photochromic layer.

In certain embodiments, the solar control film can further include a release liner 90 as illustrated in FIG. 6. The release liner 90 protects the adhesive layer 80 during shipping and handling of the solar control film 10. The release liner 90 will be removed before the solar control film 10 is applied to a window. Thus, the transmissive properties of the release liner 90 are not important; the release liner 90 can be opaque to visible light or can be translucent. Therefore, the composition and thickness of the release liner 90 is not critical. In a particular embodiment where the solar control film 10 is stored as a roll, the thickness of the release liner 90 is selected to allow the solar control film 10 to be flexible. In another embodiment, the release liner 90 is not used. For example, the solar control film 10 may be installed onto a window shortly after the solar control film 10 is fabricated. After the adhesive layer 80 is applied, the solar control film 10 is installed onto a window.

As illustrated in FIG. 6, in certain embodiments, a hard coat layer 100 can lie along the substrate 20 on a surface opposite the solar control layer. The hard coat layer 100 can provide improvement in abrasion resistance, so that the substrate layer 20 is less likely to be scratched. The hard coat layer 100 can include a cross-linked acrylate, an acrylate containing nanoparticles, such as $SiO_2$ or $Al_2O_3$, or any combination thereof. The hard coat layer 100 can have a thickness in a range of 1 micron to 5 microns.

In particular embodiments, the hard coat layer 100 can further include IR reflecting and/or absorbing nanoparticles. Such inclusion of IR reflecting and/or absorbing nanoparticles can further improve the solar control performance of the stack as a whole, and even allow for thinner or fewer silver layers.

Another aspect of the present disclosure is directed to a method of making a solar control film. In general, certain embodiments can include the steps of:

a. providing a substrate, optionally containing a hardcoat layer;
b. forming a solar control layer; and
c. forming a photochromic layer.

In certain embodiments, the substrate can be provided with a hardcoat layer already formed on a major surface of the substrate, or in other embodiments, the hardcoat layer can be formed at a later point in processing.

In certain embodiments, formation of the solar control layer can occur by sputtering, ion beam deposition, plating, or plasma-enhanced chemical vapor deposition. In a particular embodiment, the solar control layer can be formed by DC magnetron, pulsed DC, dual pulsed DC, or dual pulsed AC sputtering using rotatable or planar targets.

Similarly, in particular embodiments, the photochromic layer can be formed by sputtering, ion beam deposition, plating, or plasma-enhanced chemical vapor deposition. In a particular embodiment, the photochromic layer can be formed by DC magnetron, pulsed DC, dual pulsed DC, or dual pulsed AC sputtering using rotatable or planar targets. For example, particular embodiments include inorganic photochromic layers that can be deposited by the above described techniques enabling thinner and more conformable photochromic layers than wet coated organic photochromic layers.

In particular embodiments, the photochromic layer can be formed in-line with the solar control layer. For example, when using inorganic materials for both the solar control layer and the photochromic layer, the two can be formed in line with traditional equipment, such as sputtering apparatuses as described above. Consequently, the solar control layer and the photochromic layer can be formed continuously.

In such embodiments, the solar control layer can be deposited first, or in other embodiments, the photochromic layer can be formed before the solar control layer. The precise ordering can depend, in part, on the desired end film construction and the desired application.

Figure 7:
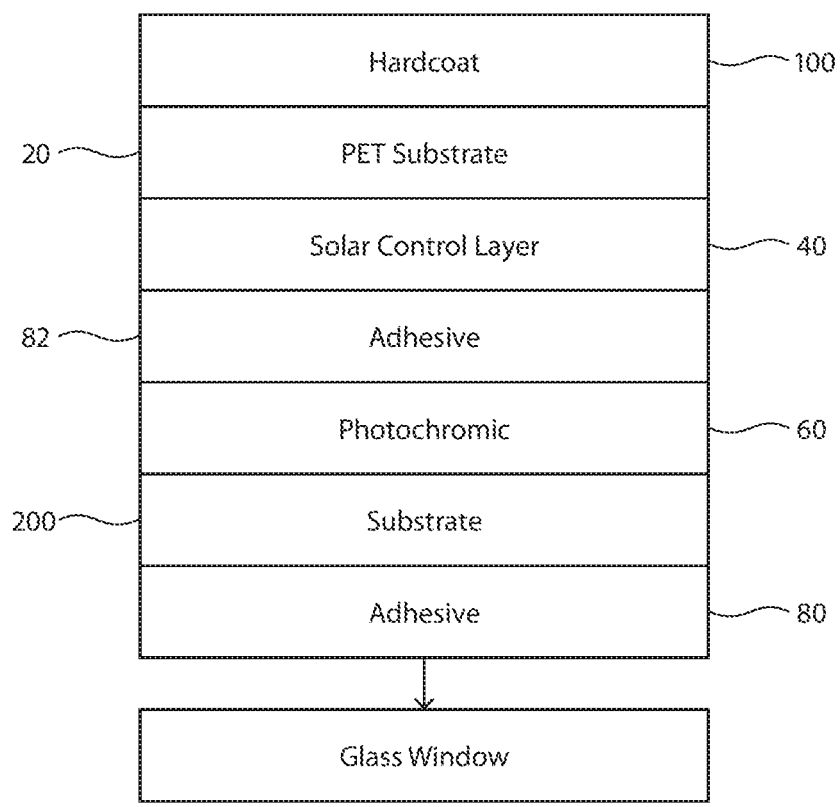
FIG. 7 includes an illustration of a solar control film formed from two separate films according to one embodiment.

In other embodiments, the method can include forming a solar control layer 40 on a substrate 20 and separately, forming a photochromic layer 60 on another substrate 200. The two films can then be laminated together with, for example, a laminating adhesive 82 as illustrated in FIG. 7.

In certain embodiments, the solar control film can have a desirable ultraviolet light transmittance (TUV). The TUV is a measure of the total amount of ultraviolet light that is transmitted through the film. The TUV can be measured according to standard ISO 9050. In the embodiments of the present disclosure containing a photochromic layer, the TUV can be variable depending on the length and intensity of exposure to ultraviolet light. As used herein, unless otherwise expressly stated, the TUV is measured in the bleach state, i.e. without any exposure to TUV light for at least 2 hours before testing. Accordingly, in particular embodiments, the solar control film can have a TUV of at least about 0.01%, at least about 0.05%, or even at least about 0.1%. In further embodiments, the solar control film can have a TUV of no greater than about 75%, no greater than about 50%, no greater than a bout 40%, no greater than about 30%, no greater than about 20%, no greater than about 15%, no greater than about 10%, no greater than about 5%, or even no greater than about 3%. Moreover, the solar control film can have a TUV in a range of any of the minimums and maximums provided above, such as in a range of from about 0.01% to about 75%, about 0.05% to about 20%, or even about 0.1% to 10%.

When in the exposed or dark state, the solar control film can have a lower TUV than the bleached state. As used herein, when measuring the TUV in the exposed or dark state, the film is exposed to ultraviolet light for a sufficient time and intensity for the solar control film to make a full transition to a tinted state. Typically, this transition fully occurs after about 1 hours, but can vary depending on the exact materials and layering used. Accordingly, in certain embodiments, the solar control film can have a dynamic TUV capability in response to UV light. The dynamic TUV capability can be determined according to the following formula (I):

$$\text{Dynamic } TUV \text{ Capability} = 100\% \cdot (TUV_B - TUV_E)/(TUV_B) \quad (I)$$

wherein $TUV_B$ refers to the total solar energy rejection in the bleached state, and $TUV_E$ refers to the total solar energy rejection after sufficient exposure to ultraviolet light for a full transition to a tinted state. Accordingly, in particular embodiments, the solar control film can have a dynamic TUV capability of at least about 1%, at least about 3%, at least about 5%, at least about 7%, at least about 9%, or even at least about 11%. In further embodiments, the solar control film can have a dynamic TUV capability of no greater than 99%, no greater than 98%, or even no greater than 97%. Moreover, the solar control film can have a dynamic TUV capability in a range of any of the minimum and maximums provided above, such as in a range of from 1% to 99%, 3% to 99%, 5% to 99%, 7% to 99%, 9% to 99%, or even 11% to 99%.

In certain embodiments, the solar control film can have a desirable Total Solar Energy Rejection (TSER). The TSER is a measure of the total amount of solar energy that is rejected by the film. The TSER can be measured according to standard ISO 9050. In the embodiments of the present disclosure containing a photochromic layer, the TSER can be variable depending on the length and intensity of exposure to ultraviolet light. As used herein, unless otherwise expressly stated, the TSER is measured in the bleach state, i.e. without any exposure to UV light for at least 2 hours before testing. Accordingly, in particular embodiments, the solar control film can have a TSER of at least about 30%, at least about 35%, at least about 40%, at least about 45%, at least about 50%, at least about 55%, or even at least about 60%. In further embodiments, the solar control film can have a TSER of no greater than about 90%, no greater than 85%, or even no greater than 80%. Moreover, the solar control film can have a TSER in a range of any of the minimums and maximums provided above, such as in a range of from 45% to 90%, 50% to 90%, or even 55% to 90%.

When in the exposed or dark state, the solar control film can have a higher TSER than the bleached state. As used herein, when measuring the TSER in the exposed or dark state, the film is exposed to ultraviolet light for sufficient time and intensity to fully transition to a tinted state, typically about 1 hour. Accordingly, in certain embodiments, the solar control film can have a dynamic TSER capability in response to UV light. The dynamic TSER capability can be determined according to the following formula (I):

$$\text{Dynamic TSER Capability} = 100\% \cdot (TSER_E - TSER_B)/(VLT_E) \quad (I)$$

wherein $TSER_B$ refers to the total solar energy rejection in the bleached state, and $TSER_E$ refers to the total solar energy rejection sufficient after exposure to UV light for a full transition to a tinted state. Accordingly, in particular embodiments, the solar control film can have a dynamic TSER capability of at least about 1%, at least about 3%, at least about 5%, at least about 7%, at least about 9%, or even at least about 11%. In further embodiments, the solar control film can have a dynamic TSER capability of no greater than 85%, no greater than 75%, or even no greater than 50%. Moreover, the solar control film can have a dynamic TSER capability in a range of any of the minimum and maximums provided above, such as in a range of from 1% to 85%, 3% to 75%, 5% to 75%, 7% to 75%, 9% to 75%, or even 11% to 50%.

In certain embodiments, the solar control film can have a desirable visible light transmittance (VLT). Visible light transmittance (VLT) refers to the percentage of the visible spectrum (380 to 780 nanometers) that is transmitted through a solar control film. The visible light transmittance can be measured according to ISO 9050. In certain embodiments of the present disclosure containing a photochromic layer, the VLT can be variable depending on the length and intensity of exposure to ultraviolet light. As used herein, unless otherwise expressly stated, the visible light transmittance is measured in the bleach state, i.e. without any exposure to UV light for at least 2 hours before testing. Accordingly, in particular embodiments, the solar control film can have a VLT of at least about 40%, at least about 50%, at least about 60%, or even at least about 65% as measured in the bleached state. In further embodiments, the solar control film can have a VLT of no greater than 99%, no greater than 95%, or even no greater than 90% as measured in the bleached state. Moreover, the solar control film can have a VLT in a range of any of the minimums and maximums provided above, such as in a range of from 40% to 99%, 50% to 95%, 60% to 95%, or even 65% to 90%.

When in the exposed or dark state, the solar control film can have a lower VLT than the bleached state. As used herein, when measuring the VLT in the exposed or dark state, the film is exposed to ultraviolet light for a sufficient period of time and intensity to transition the solar control film to a fully tinted state, typically about 1 hour. Accordingly, in certain embodiments, the solar control film can have a dynamic VLT capability in response to UV light. The dynamic VLT capability can be determined according to the following formula (I):

$$\text{Dynamic VLT Capability} = 100\% * (VLT_B - VLT_E)/(VLT_B) \quad (I)$$

wherein $VLT_B$ refers to the total solar energy rejection in the bleached state, and $VLT_E$ refers to the total solar energy rejection after sufficient exposure to UV light for a full transition to the tinted state. Accordingly, in particular embodiments, the solar control film can have a dynamic VLT capability of at least about 10%, at least about 12%, at least about 14%, at least about 16%, at least about 18%, or even at least about 20%. In further embodiments, the solar control film can have a dynamic VLT capability of no greater than no greater than 99%, no greater than 95%, or even no greater than 90%. Moreover, the solar control film can have a dynamic VLT capability in a range of any of the minimum and maximums provided above, such as in a range of from 10% to 99%, 12% to 99%, 14% to 95%, 16% to 95%, 18% to 95%, or even 20% to 90%.

A particular advantage of certain embodiments of the present disclosure is the ability to provide a solar control film that is free of the traditionally required UV protection counter substrate while still maintaining filtering and control of ultraviolet light to the solar control layer.

In particular embodiments, the solar control film can have a low haze. For example, the solar control film can have a haze of no greater than 5%, no greater than 4%, no greater than 3%, or even no greater than 1%. In further embodiments, the solar control film can have a haze of at least 0.01%. as measured according to ASTM D1003. A particular advantage of certain embodiments of the present disclosure is the ability to incorporate a photochromic layer and meet strict industry demands for haze.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A solar control film comprising:
  a. a photochromic layer comprising an inorganic photochromic material; and
  b. an infrared control layer.

Item 2. A solar control film comprising:
  a. a sputtered photochromic layer; and
  b. a sputtered solar control layer.

Item 3. A solar control film comprising a solar control layer and a photochromic layer comprising an inorganic photochromic layer integrated into the solar control film.

Item 4. A solar control film comprising:
  a. a solar control layer; and
  b. a photochromic layer;
  c. wherein the solar control layer is susceptible to degradation from long term exposure to UV light; and
  d. wherein the photochromic layer has a UV transmission of no greater than about 5%, and wherein the solar control film is layered such that, when installed, sun light is filtered through the photochromic layer before reaching the solar control layer such that the photochromic layer provides UV stability to the solar control layer.

Item 5. A solar control film comprising:
  a. a substrate layer;
  b. a solar control layer, wherein the solar control layer comprises one or more precious metal layers, such as one or more silver layers, and wherein the solar control layer has a total precious metal layer thickness that is lower than an equivalent thickness of precious metal material required to achieve a TSER of at least about 55% and a VLT of at least about 65% without the photochromic layer present.
  c. a photochromic layer.

Item 6. A solar control film adapted to dynamically control the ultraviolet light transmission, visible light transmission and infrared transmission in response to exposure to UV light,
  a. wherein the solar control film has a ultraviolet light transmittance dynamic capability of at least about 5% TUV in response to sufficient exposure to UV light for a full transition to a tinted state,
  b. wherein the solar control film has a visible light transmittance dynamic capability of at least about 10% VLT in response to exposure to UV light for 1 hour, and
  c. wherein the solar control film has a total solar energy rejection (TSER) dynamic capability of at least about 1% in response to sufficient exposure to UV light for a full transition to a tinted state.

Item 7. A solar control film having a first state and a second state, wherein the solar control film is adapted to transition from the first state to the second state in response to UV light, wherein in the first state, the solar control film has a VLT of at least about 60%, and wherein in the second state, the solar control film has a VLT of less than the VLT of the solar control film in the first state, and wherein in the first state, the solar control film has a TSER of at least about 15%, and wherein the second state, the solar control film has a greater TSER than in the first state.

Item 8. A solar control film interlayer comprising a photochromic layer comprising an inorganic photochromic layer adapted to provide UV protection to a solar control layer.

Item 9. A method of forming a solar control film comprising:
  a. providing a substrate;
  b. forming a solar control layer; and c. forming a photochromic layer in-line with the solar control layer.

Item 10. A method of forming a solar control film comprising:
   a. providing a substrate;
   b. forming a solar control layer; and
   c. forming a photochromic layer comprising an inorganic photochromic material.

Item 11. A method of forming a solar control film comprising:
   a. forming a solar control layer through sputtering; and
   b. forming a photochromic layer through sputtering.

Item 12. A method of forming a solar control assembly comprising:
   a. providing a solar control film comprising:
   b. a solar control layer; and
   c. an inorganic photochromic layer;
   d. laminating the solar control film onto a substrate.

Item 13. The method of item 12, wherein the substrate comprises a glass substrate.

Item 14. The method of item 12, wherein the substrate comprises a polymeric substrate.

Item 15. The method of item 14, wherein the polymer substrate comprises PET.

Item 16. The solar control film or method of any one of the preceding items, wherein the photochromic layer comprises a photochromic material comprising an inorganic material.

Item 17. The solar control film or method of any one of the preceding items, wherein the photochromic layer comprises a photochromic material comprising an inorganic oxide.

Item 18. The solar control film or method of any one of the preceding items, wherein the photochromic layer comprises a photochromic material comprises an inorganic metal oxide.

Item 19. The solar control film or method of any one of the preceding items, wherein the photochromic layer comprises a photochromic material comprises an oxide of molybdenum, tungsten, vanadium, titanium, zirconium, tantalum, niobium, yttrium, zinc, or combinations of the preceding metal oxides.

Item 20. The solar control film or method of any one of the preceding items, wherein the photochromic layer comprises a photochromic material comprising an oxide of molybdenum, tungsten, vanadium, titanium, zirconium, tantalum, niobium, yttrium, zinc, or combinations of the preceding metal oxides and a metal.

Item 21. The solar control film or method of any one of the preceding items, wherein the photochromic layer comprises a photochromic material comprising an oxide of molybdenum, tungsten, vanadium, titanium, zirconium, tantalum, niobium, yttrium, zinc, or combinations of the preceding metal oxides and silver.

Item 22. The solar control film or method of any one of the preceding item, wherein the photochromic layer comprises a photochromic material comprising hydrated yttrium oxide.

Item 23. The solar control film or method of any one of the preceding items, wherein the photochromic layer has a thickness in a range of from 50 nanometers to 2000 nanometers, or even 100 nanometers to 1000 nanometers.

Item 24. The solar control film or method of any one of the preceding items, wherein the photochromic layer is adapted to decrease the visible light transmission when exposed to ultraviolet light.

Item 25. The solar control film or method of any one of the preceding items, wherein the photochromic layer is adapted to absorb at least 5%, at least 10%, at least 15%, or even at least 20% more visible light in response to sufficient exposure to UV light for a full transition to a tinted state.

Item 26. The solar control film or method of any one of the preceding items, wherein the photochromic layer is adapted to protect the solar control layer from degradation from UV light.

Item 27. The solar control film or method of any one of the preceding items, wherein the photochromic layer is adapted to protect the solar control layer from degradation from UV light.

Item 28. The solar control film or method of any one of the preceding items, wherein the solar control film comprises an adhesive layer, and wherein the photochromic layer is disposed between the adhesive layer and the solar control layer.

Item The solar control film or method of any one of the preceding items, wherein the solar control layer comprises a precious metal layer.

Item 30. The solar control film or method of any one of the preceding items, wherein the solar control layer comprises one precious metal layer.

Item 31. The solar control film or method of any one of the preceding items, wherein the solar control layer comprises two precious metal layers.

Item 32. The solar control film or method of any one of the preceding items, wherein the precious metal layer is a silver layer.

Item 33. The solar control film of any one of the preceding items, wherein the solar control layer comprises a precious metal layer; and wherein the total thickness of all precious metal layers is in a range of from 5 nanometers to 30 nanometers.

Item 34. The solar control film of any one of the preceding items, wherein the solar control layer comprises a precious metal layer; wherein the total thickness of all precious metal layers is in a range of from 5 nanometers to 30 nanometers; and wherein the solar control film has a TSER of at least about 55% and a VLT of at least about 65%.

Item 35. The solar control film or method of any one of the preceding items, wherein the solar control layer comprises an IR reflecting and/or absorbing nanoparticle dispersed within a binder.

Item 36. The solar control film or method of any one of the preceding items, wherein the solar control layer comprises a multi-layer construct comprising a plurality of alternating layers of differing refractive indices.

Item 37. The solar control film or method of any one of the preceding items, wherein the substrate layer comprises a polymeric layer.

Item 38. The solar control film of any one of the preceding items, wherein the polymeric substrate layer comprises a PET film.

Item 39. The solar control film of any one of the preceding items, wherein the substrate layer comprises glass.

Item 40. The solar control film of any one of the preceding items, wherein the solar control film is essentially free of a counter substrate.

Item 41. The solar control film of any one of the preceding items, wherein the photochromic layer is disposed between the first adhesive layer and the second adhesive layer.

Item 42. The solar control film of any one of the preceding items, wherein the photochromic layer is disposed between and directly contacting the first adhesive layer and the second adhesive layer.

Item 43. The solar control film of any one of the preceding items, wherein the solar control film has a transmittance of ultraviolet light (TUV) of at least about 0.01%, at least about 0.05%, or even at least about 0.1% as measured in the bleached state.

Item 44. The solar control film of any one of the preceding items, wherein the solar control film has a TUV of no greater than about 75%, no greater than about 50%, no greater than about 40%, no greater than about 30%, no greater than about 20%, no greater than about 15%, no greater than about 10%, no greater than about 5%, or even no greater than about 3% as measured in the bleached state.

Item 45. The solar control film of any one of the preceding items, wherein the solar control film has a lower TUV after sufficient exposure to ultraviolet light for a full transition to a tinted state.

Item 46. The solar control film of any one of the preceding items, wherein the solar control film has a TUV in a range of from about 0.01% to about 75%, about 0.05% to about 20%, or even about 0.1% to 10% as measured in the bleached state.

Item 47. The solar control film of any one of the preceding items, wherein the solar control film has a ultraviolet light transmittance dynamic capability of at least about 1%, at least about 3%, at least about 5%, at least about 7%, at least about 9%, or even at least about 11% in response to sufficient exposure to ultraviolet light for a full transition to a tinted state.

Item 48. The solar control film of any one of the preceding items, wherein the solar control film has a ultraviolet light transmittance dynamic capability of no greater than 99%, no greater than 98%, or even no greater than 97% in response to sufficient exposure to ultraviolet light for a full transition to a tinted state.

Item 49. The solar control film of any one of the preceding items, wherein the solar control film has a ultraviolet light transmittance dynamic capability in a range of 1% to 99%, 3% to 99%, 5% to 99%, 7% to 99%, 9% to 99%, or even 11% to 99% in response to sufficient exposure to ultraviolet light for a full transition to a tinted state.

Item 50. The solar control film of any one of the preceding items, wherein the solar control film has a VLT of at least about 40%, at least about 50%, at least about 60%, or even at least about 65% as measured in the first state (or bleached state).

Item 51. The solar control film of any one of the preceding items, wherein the solar control film has a lower VLT in response to sufficient exposure to ultraviolet light for a full transition to a tinted state.

Item 52. The solar control film of any one of the preceding items, wherein the solar control film has a visible light transmittance dynamic capability of at least about 10%, at least about 12%, at least about 14%, at least about 16%, at least about 18%, or even at least about 20% in response to sufficient exposure to ultraviolet light for a full transition to a tinted state.

Item 53. The solar control film of any one of the preceding items, wherein the solar control film has a total solar energy rejection (TSER) of at least about 30%, at least about 35%, at least about 40%, at least about 45%, at least about 50%, at least about 55%, or even at least about 60%.

Item 54. The solar control film of any one of the preceding items, wherein the solar control film has a total solar energy rejection (TSER) dynamic capability of at least about 1%, at least about 3%, at least about 5%, at least about 7%, at least about 9%, or even at least about 11% in response to sufficient exposure to ultraviolet light for a full transition to a tinted state.

Item 55. An assembly comprising:
a. a substantially transparent substrate, and
b. the solar control film of any one of the preceding items adjacent the substantially transparent substrate;
c. wherein the solar control film absorbs at least 5%, at least 10%, at least 15%, or even at least 20% more visible light in response to sufficient exposure to ultraviolet light for a full transition to a tinted state as measured before laminating to the transparent substrate; and
d. wherein the assembly maintains at least 70%, at least 80%, at least 90%, or even at least 95% of the difference between visible light transmission before and after sufficient exposure to ultraviolet light for a full transition to a tinted state as measured after lamination to the transparent substrate.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A solar control film comprising a solar control layer, an adhesive layer and a photochromic layer that comprises an inorganic metal oxide, wherein the photochromic layer is disposed between the adhesive layer and the solar control layer, wherein the solar control film has a first state and a second state, wherein the solar control film is adapted to transition from the first state to the second state in response to ultraviolet light, wherein in the first state, the solar control film has a visible light transmission of at least 60%, and wherein in the second state, the solar control film has a visible light transmission of less than the visible light transmission of the solar control film in the first state, and wherein in the first state, the solar control film has a total solar energy rejection of at least 15%, and wherein in the second state, the solar control film has a greater total solar energy rejection than in the first state.

2. The solar control film of claim 1, wherein the solar control film has a transmittance of ultraviolet light of no greater than 75% as measured in a bleached state.

3. The solar control film of claim 1, wherein the photochromic layer comprises an oxide of molybdenum, tungsten, vanadium, titanium, zirconium, tantalum, niobium, yttrium, zinc, or combinations of the preceding metal oxides and silver.

4. The solar control film of claim 1, wherein the photochromic layer comprises hydrated yttrium oxide.

5. The solar control film of claim 1, wherein the photochromic layer has a thickness in a range of 50 nanometers to 2000 nanometers.

6. The solar control film of claim 1, wherein the photochromic layer is adapted to decrease the visible light transmission when exposed to ultraviolet light.

7. The solar control film of claim 1, wherein the photochromic layer is adapted to protect a solar control layer from degradation from ultraviolet light.

8. The solar control film of claim 7, wherein the solar control layer comprises a precious metal layer.

9. The solar control film of claim 1, wherein the solar control film has a transmittance of ultraviolet light of at least 0.1% to 10% as measured in a bleached state.

10. The solar control film of claim 1, wherein the solar control film has a dynamic total solar energy rejection capability of at least 1% in response to sufficient exposure to ultraviolet light for a full transition to a tinted state.

11. The solar control film of claim 1, wherein the solar control layer comprises a precious metal layer; wherein the total thickness of all precious metal layers is in a range of from 5 nanometers to 30 nanometers; and wherein the solar control film has a total solar energy rejection of at least 55% and a visual light transmittance of at least 65%.

12. The solar control film of claim 1, wherein the solar control layer comprises a multi-layer construct comprising a plurality of alternating layers of differing refractive indices.

13. The solar control film of claim 1, wherein the solar control film has a ultraviolet light transmittance dynamic capability in a range of 11% to 99% in response to sufficient exposure to ultraviolet light for a full transition to a tinted state.

14. The solar control film of claim 1, wherein the solar control film has a visible light transmittance dynamic capability of at least 20% in response to sufficient exposure to ultraviolet light for a full transition to a tinted state.

15. The solar control film of claim 1, wherein the solar control film has a total solar energy rejection dynamic capability of at least 11% in response to sufficient exposure to ultraviolet light for a full transition to a tinted state.

16. The solar control film of claim 1, wherein the photochromic layer is disposed between and directly contacting a first adhesive layer and a second adhesive layer.

17. The solar control film of claim 1, wherein the photochromic layer is sputtered.

18. The solar control film of claim 1, wherein the solar control film is essentially free of a counter substrate.

* * * * *